US012752288B2

(12) United States Patent
Wendel et al.

(10) Patent No.: US 12,752,288 B2
(45) Date of Patent: Oct. 6, 2026

(54) HOUSING OF AN INDUCTION HARDENING TOOL

(71) Applicant: AKTIEBOLAGET SKF, Gothenburg (SE)

(72) Inventors: Michael Wendel, Bremen (DE); Martina Sticht, Sennfeld (DE); Gerhard Wagner, Prichsenstadt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 185 days.

(21) Appl. No.: 18/676,699

(22) Filed: May 29, 2024

(65) Prior Publication Data

US 2024/0399390 A1 Dec. 5, 2024

(30) Foreign Application Priority Data

Jun. 5, 2023 (DE) ......................... 102023205217.2

(51) Int. Cl.
*B05B 1/14* (2006.01)
*B05B 12/00* (2018.01)
(Continued)

(52) U.S. Cl.
CPC .............. *B05B 1/14* (2013.01); *B05B 12/004* (2013.01); *B05B 15/14* (2018.02); *C21D 1/18* (2013.01); *C21D 1/42* (2013.01); *C21D 1/60* (2013.01); *C21D 11/00* (2013.01); *H05B 6/02* (2013.01); *H05B 6/101* (2013.01); *B05B 15/65* (2018.02);
(Continued)

(58) Field of Classification Search
CPC ......... B05B 1/14; B05B 15/14; B05B 12/004; B05B 15/65; C21D 1/18; C21D 1/42; C21D 1/60; C21D 1/10; C21D 1/667; C21D 9/0062; C21D 11/00; H05B 6/02; H05B 6/101; B67D 1/0857; B67D 3/0009
USPC ............. 148/526, 644; 239/289, 139.2, 132; 266/259; 222/146.6; 257/714, 712; 62/118
See application file for complete search history.

(56) References Cited

U.S. PATENT DOCUMENTS 2,481,961 A * 9/1949 Ward, Jr. ................ F23D 14/38 239/132.3
3,687,145 A * 8/1972 Schrader ................ C21D 1/667 134/122 R
(Continued)

FOREIGN PATENT DOCUMENTS

GB 2228432 A 8/1990
JP 3397297 B2 4/2003

OTHER PUBLICATIONS

Extended European Search Report from the European Patent Office dated Oct. 21, 2024 in related EP application No. 24 178 023.8 including machine translation of Search Opinion and Search Report.

*Primary Examiner* — Kevin Edward Schwartz
(74) *Attorney, Agent, or Firm* — J-TEK LAW PLLC; Scott T. Wakeman; Mark A. Ussai

(57) ABSTRACT

A housing for a component of an inductive hardening system includes a basic body having a coolant inlet and a coolant outlet, and at least one cover element connected to the basic body and having at least one coolant passage in fluidic communication with the coolant inlet and the coolant outlet, the coolant passage being configured to carry a coolant for actively cooling the housing. The housing may be configured as a spray head for a quenching device.

16 Claims, 2 Drawing Sheets

(51) Int. Cl.

| | |
|---|---|
| ***B05B 15/14*** | (2018.01) |
| ***B05B 15/65*** | (2018.01) |
| ***C21D 1/10*** | (2006.01) |
| ***C21D 1/18*** | (2006.01) |
| ***C21D 1/42*** | (2006.01) |
| ***C21D 1/60*** | (2006.01) |
| ***C21D 1/667*** | (2006.01) |
| ***C21D 9/00*** | (2006.01) |
| ***C21D 11/00*** | (2006.01) |
| ***H05B 6/02*** | (2006.01) |
| ***H05B 6/10*** | (2006.01) |

(52) U.S. Cl.
CPC ............... *C21D 1/10* (2013.01); *C21D 1/667* (2013.01); *C21D 9/0062* (2013.01)

(56) References Cited

U.S. PATENT DOCUMENTS

| | | | | |
|---|---|---|---|---|
| 3,738,629 | A * | 6/1973 | Coleman ................ | C21D 1/667 134/122 R |
| 5,547,129 | A * | 8/1996 | Fortunato ............. | B05B 7/1673 239/557 |
| 2003/0206820 | A1* | 11/2003 | Keicher .................. | B22F 10/25 419/9 |
| 2012/0039761 | A1* | 2/2012 | Sprouse .................. | F23L 7/005 239/127.1 |
| 2018/0245173 | A1* | 8/2018 | Brummayer ............ | C22C 38/32 |
| 2021/0062291 | A1* | 3/2021 | Hinojosa Garza ... | C21D 11/005 |
| 2021/0087644 | A1* | 3/2021 | Powell ..................... | C21D 9/10 |

* cited by examiner

HOUSING OF AN INDUCTION HARDENING TOOL

CROSS-REFERENCE

This application claims priority to German patent application no. 10 2023 205 217.2 filed on Jun. 5, 2023, the contents of which are fully incorporated herein by reference.

TECHNOLOGICAL FIELD

The present disclosure is directed to a housing for a tool, such as a quenching spray or a sensor device, which is used in inductive hardening and includes an improved cooling arrangement.

BACKGROUND

To harden workpieces, use may be made, inter alia, of an induction hardening system, by means of which an entire workpiece, but also individual regions of a workpiece, can be hardened. For this purpose, the workpiece can be heated locally to up to 1000° C. After being heated to a required hardening temperature, the workpiece subsequently has to be quenched. During the quenching, a quenching fluid, such as water, is applied to the workpiece using a quenching spray.

Since the quenching takes place immediately after the heating, the quenching spray has to be brought into the vicinity of the workpiece, which is heated to a temperature of up to 1000° C., as a result of which the materials of the quenching spray and the quenching spray itself are exposed to very high temperatures. For this reason, quenching sprays and other induction hardening tools that are exposed to the high temperatures during the induction hardening, such as sensor housings, may be produced from high-alloy materials in order to withstand the radiated heat and convection heat to which they are exposed. They can be produced by casting, 3D printing, welding, etc. The materials may be ceramic or stainless steel alloys, which are usually expensive and/or require complex production processes in order to achieve only a low distortion and a high degree of precision despite the high melting point of the materials.

SUMMARY

It is an aspect of the present disclosure to provide a quenching spray or, in general, a housing for a tool which is used in induction hardening, which is more cost-effective and easier to manufacture, but nevertheless can withstand the high temperatures in inductive metal processing and is not magnetic or ferromagnetic.

SUMMARY

A housing of an induction hardening tool which is used in inductive hardening, in particular of a quenching spray or a sensor, is presented below.

In order for the tool or the housing of the tool to be able to resist the high radiated heat and convection heat, the housing has a cover element and a basic body connected thereto, wherein, furthermore, at least one coolant inlet and a coolant outlet are formed in the basic body, and at least one coolant passage, which is fluidically connected to the coolant inlet and the coolant outlet in order to actively cool the housing by means of a coolant, is formed in the cover element.

According to a preferred exemplary embodiment, the cover element is configured to receive at least part of a sensor device, in particular the measuring part of a sensor.

According to a further preferred exemplary embodiment, the housing is configured as a housing for a quenching spray of an induction hardening system, in which a plurality of through bores, which are designed as spray holes, are provided in the cover element. In addition, a quenching fluid inlet is formed in the basic body, the quenching fluid inlet being fluidically connected to the plurality of spray holes such that a quenching fluid can be applied to a workpiece to be quenched through the spray holes.

The active cooling makes it possible for the housing of the tool, i.e., in other words, the quenching spray or the sensor, to be positioned very close to the inductively heated and thus glowing workpiece (e.g. at a distance of 1 mm). This can be advantageous for quenching sprays to achieve high quenching pressures, cooling rates and thus a good utilization of the quenching fluid flow used. Sensors may also require short distances to the workpiece to be measured to ensure a stable and accurate measurement.

Furthermore, materials, such as plastic or aluminum, which have a relatively low melting point, can be used. By using such materials, a tool or a quenching spray can be manufactured with very high precision and low distortion, and therefore the production costs are low and the production process simplified. The use of materials with a low melting point and the associated lower strength also make it easier to rework the tools (e.g. drilling small holes, milling surfaces, etc.).

The quenching fluid or another coolant, such as compressed air or water, can be used as the coolant. If a coolant different from the quenching fluid is used in a quenching spray, it is of course advantageous that the coolant inlet and the quenching fluid inlet are formed as separate inlets. Furthermore, it is also possible additionally to apply cooling medium to the quenching fluid inlet in order to provide a particularly intensive cooling of the quenching spray or of the cover element before then quenching with the quenching fluid. In this case, the quenching fluid inlet can be charged either with cooling medium or with quenching fluid, for example by means of a valve arrangement. However, the above-mentioned separate inlets may also be advantageous when using quenching fluid as a coolant, since it is then ensured that fluid is sufficiently available for the quenching. It is also possible to individually adjust the quenching fluid flow and the coolant flow such that different quantities of fluid can be used for the quenching and for the cooling.

Alternatively, if the same fluid is used as the quenching fluid and the coolant, the quenching fluid inlet and the coolant inlet can be designed, of course, as a common inlet in quenching sprays. In this case, it may be advantageous furthermore to provide at least one fluid guiding device in the housing that is configured to guide the quenching fluid both to the spray holes and into the at least one coolant channel.

According to a further preferred exemplary embodiment, the cover element and the basic body are releasably connectable to each other. This makes it possible, with the same basic body, to provide different cover element solutions which are adapted to the respective application. For example, the cover elements may be designed with different spray hole designs to change the quenching fluid flow, the pressure or the direction and/or to adapt same to the workpiece to be quenched. Another example would be to adapt the cover element to different sensor sizes. It is thereby also possible to provide the cover element and the basic body from different materials such that the heat-exposed cover element is composed of a material that withstands higher temperatures than the basic body of the tool housing.

In the case of quenching sprays, the design of the cover element and basic body also allows the cover element itself to be adapted to different workpiece geometries and/or surfaces to be cooled. The number of spray holes, the size of the holes or the angle of inclination in relation to the workpiece surface and their relative movement can be adjusted by simply placing a correspondingly designed cover element thereon. In the case of a quenching process during the heat treatment, this means that the cooling intensity can be controlled to ensure a good structure, reduce the risk of cracks, ensure a good level of residual stresses, etc. Another advantage of a good use of the quenching fluid is that the typical initial vapor phase during the quenching can be reduced with water, for example, resulting in less quenching interference (inhomogeneous and slow quenching due to the insulating vapor phase on the hot steel surface) and faster quenching.

In addition, in particular in the case of bearing components which are inductively hardened, the adaptation of the cover element of the quenching spray to the component geometry can lead to a well-defined and locally controlled quenching intensity of the surface to be quenched, as a result of which the stresses during the quenching and the state of residual stress after quenching can be influenced, which results in a lower risk of cracks and better bearing performance because of homogeneous compressive stresses along the surface.

The interchangeability because of the releasable connection between the cover element and the basic body also enables the coolant supply and distribution to be controlled via different coolant passage configurations.

According to another preferred exemplary embodiment, the at least one coolant passage is arranged in at least one of the side walls of the cover element. This allows a major portion of the surface facing the workpiece to be hardened inductively to be used for the actual task of the tool, such as the quenching or the bearing and aligning of the sensor, while the housing as a whole is simultaneously cooled.

In this case, it is particularly advantageous if the cover element has a first, second, third and fourth side wall, wherein the first and second side wall and the third and fourth side wall are arranged opposite each other, and the coolant passage comprises a coolant supply section, a coolant discharge section and a first and a second coolant guiding section, wherein the first and second coolant guiding section are formed in the first and second side walls, the coolant supply section is formed in the third side wall, and the coolant discharge section is formed in the fourth side wall.

This enables particularly uniform and comprehensive cooling of the cover element.

Furthermore, it is advantageous if the coolant supply section and/or the coolant discharge section are each designed as a chamber-like compartment. This allows coolant to be sufficiently supplied or removed.

In order to ensure a particularly good distribution of the coolant in the cover element and to avoid, for example, the coolant accumulating in a region of the housing because of an installation position of the housing, it can furthermore be provided that at least one coolant distribution structure, which is designed to distribute the coolant in the cover element, is formed in the at least one coolant passage.

Said the coolant distribution structure may also be designed as a roughened surface, or additionally have a roughened surface. The roughened surface provides an increased surface area over which heat can be dissipated to the coolant, which further improves the cooling.

It is particularly preferred for the coolant distribution structure to be provided in the first and/or second coolant guiding section. According to a particularly preferred exemplary embodiment, the coolant distribution structure is configured in such a way that a plurality of, preferably parallel, coolant channels are formed in the first and/or second side wall. This enables a high coolant throughput and ensures that no matter how the housing is positioned, coolant will flow through the coolant passage.

In the case of a quenching spray, another preferred exemplary embodiment is provided in that the spray holes are arranged in such a way that they form a spray hole pattern, wherein, furthermore, a cutout, which is formed in the region of the spray hole pattern and is configured to receive the quenching fluid and to transfer same to the spray holes, is provided in the cover element. This can ensure that the same quantity of quenching fluid is applied to each spray hole.

This uniform application can be further increased if, as another preferred exemplary embodiment shows, an intermediate element is provided, which is arranged between the basic body and the cover element, wherein the intermediate element is configured to distribute the quenching fluid from the quenching fluid inlet uniformly in the direction of the spray holes. Of course, such an intermediate element may also be provided in a housing for a sensor.

In the case of an intermediate element for quenching sprays, it is also advantageous if the intermediate element has a plurality of elongated holes, which are preferably arranged in the region of the spray hole pattern. It can thereby already be ensured with the aid of the intermediate element that the quenching fluid is uniformly guided to all of the spray holes, and therefore the same quantity of quenching fluid is applied to each spray hole at the same time.

According to a further preferred exemplary embodiment, as an alternative or in addition to the cutout formed in the cover element, the cutout is also formed in the intermediate element.

Another embodiment comprises a spray head for a quenching device of an induction hardening system. The spray head includes a basic body and a cover element connected to the basic body. The basic body has a quenching fluid inlet, an entrance coolant passage and an exit coolant passage. The cover element has an entrance coolant passage in fluid communication with the basic body entrance cooling passage and an exit coolant passage in fluid communication with the basic body exit coolant passage and a plurality of cooling channels fluidically connecting the entrance coolant passage of the cover element to the exit coolant passage of the cover element. The cover element includes a quenching fluid compartment in fluid communication with the quenching fluid inlet and a plurality of through openings forming quenching fluid outlets in fluid communication with the quenching fluid compartment. In addition, the cover element is configured to prevent a coolant in the cover entrance coolant passage and the cover exit coolant passage and the plurality of cooling channels from mixing with a quenching fluid in the quenching fluid compartment. That is, the quenching fluid does not mix with the cooling fluid.

Another aspect of the disclosure comprises a spray head for a quenching device of an induction hardening system. The spray head includes a basic body having a mounting surface and an intermediate member that has a first surface and a second opposite surface, wherein the first surface is mounted to the mounting surface of the basic body. The spray head also includes a cover element having a first surface and a second opposite surface, the first surface of the cover element being mounted to the second surface of the intermediate member such that the intermediate member is sandwiched between the basic body and the cover element.

The basic body includes a quenching fluid through-opening having an upstream end connectable to a source of quenching fluid and a downstream opening facing the intermediate member, a first coolant through-opening having a first end connectable to a coolant source and a second end facing the intermediate member and a second coolant through-opening having a first end for discharging the coolant after it has cooled the spray head and a second end facing the intermediate member.

The intermediate member includes a first coolant through-opening having a first end in the first surface of the intermediate member in fluid communication with the second end of the first coolant through-opening of the basic body and a second end in the second surface of the intermediate member facing the cover element and a second coolant through-opening having a first end in the first surface of the intermediate member in fluid communication with the second end of the second coolant through-opening of the basic body and a second end facing the cover element. The intermediate member also includes a quenching fluid chamber in fluid communication with the downstream opening of the quenching fluid through-opening of the basic body and a wall delimiting an end of the quenching fluid chamber, the wall having a plurality of through-openings configured to allow a quenching fluid in the quenching fluid chamber to exit the quenching fluid chamber in a direction toward the cover element.

The cover element includes an entrance coolant passage having a first end in the first surface of the cover element in fluid communication with the second end of the first coolant through-opening of the intermediate member and an exit coolant passage having a first end in the first surface of the cover element in fluid communication with the second end of the second coolant through-opening of the intermediate member and a plurality of cooling channels fluidically connecting the entrance coolant passage of the cover element to the exit coolant passage of the cover element. The cover element includes a quenching fluid compartment in fluid communication with the quenching fluid chamber of the intermediate member and a plurality of through openings in the second surface of the cover element in fluid communication with the quenching fluid compartment. The cover element is configured to prevent the coolant in the cover entrance coolant passage and the cover exit coolant passage and the plurality of cooling channels from mixing with the quenching fluid in the quenching fluid compartment.

Further advantages and advantageous embodiments are specified in the description, the drawings and the claims. In particular the combinations of the features specified in the description and in the drawings are purely exemplary here, and therefore the features can also be present individually or in other combinations.

BRIEF DESCRIPTION OF THE DRAWINGS

In the following text, the invention will be described in more detail using exemplary embodiments illustrated in the drawings. The exemplary embodiments and the combinations shown in the exemplary embodiments are purely exemplary here and are not intended to define the scope of protection of the invention. This is defined solely by the attached claims.

DETAILED DESCRIPTION

In the following text, identical or functionally equivalent elements are identified by the same reference signs.

FIGS. 1-5 show various views of a quenching spray (spray head), which is used in particular for quenching inductively heated workpieces. This quenching spray 1 is described by way of example for a housing for an induction tool. Alternatively, instead of a quenching spray 1, a sensor housing or similar may also have the features described below.

Figure 2:
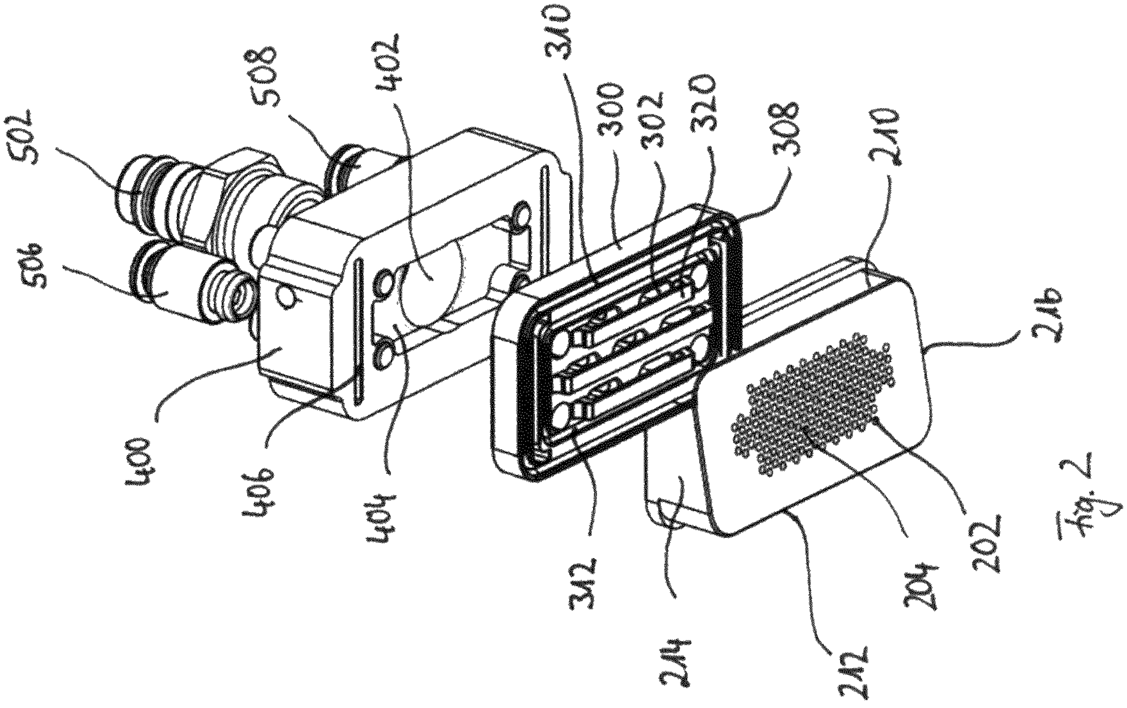
FIG. 2 is an exploded perspective view of the quenching spray of FIG. 1.
Figure 1:
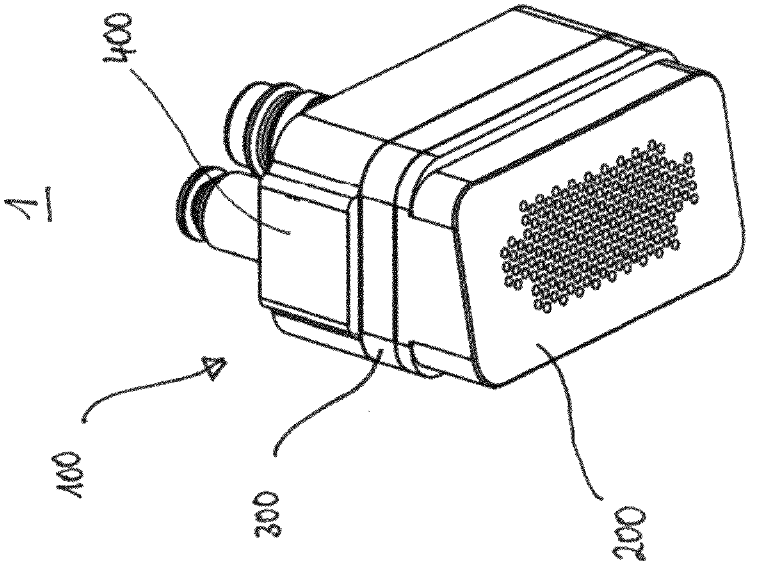
FIG. 1 is a perspective view of a quenching spray according to an embodiment of the present disclosure.
Figure 4:
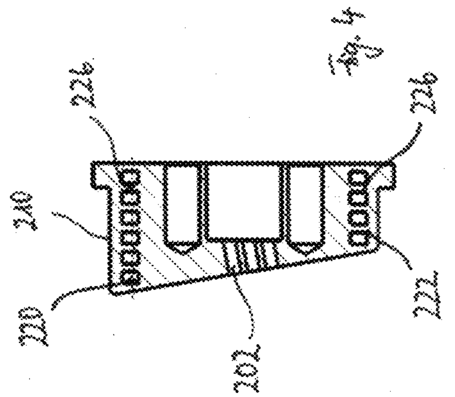
FIG. 4 is a sectional elevational view through a cover element of the quenching spray of FIG. 1.
Figure 5:
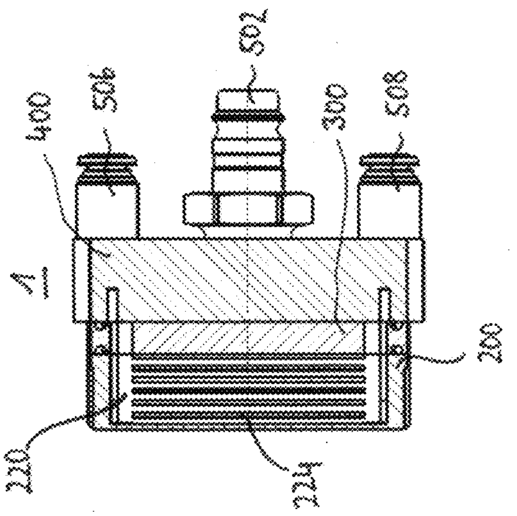
FIG. 5 is another sectional elevational view through the quenching spray of FIG. 1.
Figure 3:
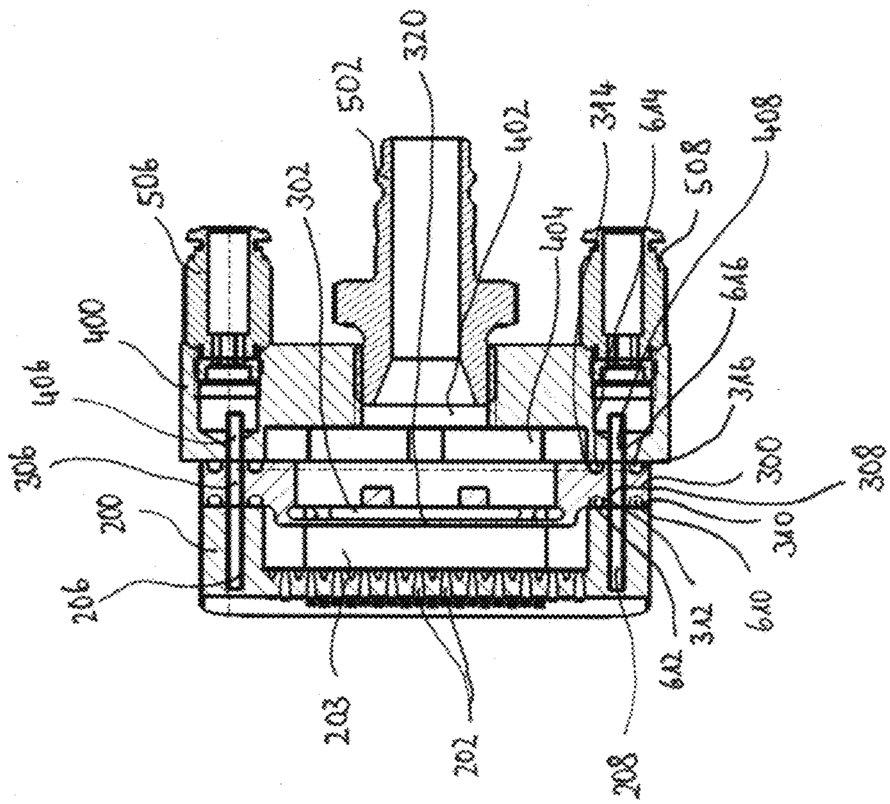
FIG. 3 is a sectional elevational view through the quenching spray of FIG. 1.

FIG. 1 schematically shows a perspective view of the quenching spray 1, while FIG. 2 shows an exploded illustration of the individual parts, and FIGS. 3, 4 and 5 illustrate different sectional views.

As can be gathered from the figures, the quenching spray 1 comprises a multi-part housing 100 which, in the illustrated exemplary embodiment, has a cover element 200, an intermediate element 300, and a basic body 400. The individual components 200, 300 and 400 are assembled to form the housing 100, as can be gathered in particular from FIGS. 2 and 3. For a fluid-tight connection between the elements 200, 300 and 400, sealing elements 610, 612, 614, 616, for example in the form of O-rings or sealing cords, are furthermore provided, which, in the illustrated exemplary embodiment, are arranged in grooves 310, 312, 314, and 316, which are formed in the intermediate element 300.

Furthermore, the basic body 400 can be provided with different elements 300 or 200 for various purposes, for example, also to carry out different tasks. For example, it is conceivable for the basic body 400 to be used both as a basic body for a quenching spray and as a basic body for a sensor, with only the intermediate element 300 and the cover element 200 being correspondingly adapted and designed for the various tasks. For example, for a sensor housing, the intermediate element 300 can be designed as a sensor carrier and the cover element 200 can have corresponding cutouts so that the sensor or the sensor element can perform measurements.

Furthermore, it can be gathered from FIGS. 1, 2 and 3 that the basic body 400, on the side facing away from the cover element 200, has a plurality of connection options for feeding a quenching fluid and/or a coolant into the housing 100. In the illustrated exemplary embodiment of the quenching spray, a quenching fluid inlet 502, a coolant inlet 506 and a coolant outlet 508 are provided for this purpose.

Furthermore, FIGS. 1 and 2 show that the cover element 200 has a plurality of spray holes 202, which are arranged in rows and columns and form a spray hole pattern 204. Furthermore, the cover element 200 has a fluid receiving compartment 203, which is arranged in the region of the spray hole pattern 204 and serves to distribute quenching fluid uniformly to the spray holes 202. As can be seen in detail in FIGS. 3 and 4, the spray holes 202 are configured as through bores through which the quenching fluid, which is introduced into the housing 100 via the quenching fluid inlet 502, can escape to cool a workpiece which is to be processed. For this purpose, the basic body 400 has a recess 402 that is fluidically connected to the quenching fluid inlet 502. The recess 402 opens into a cavity 404 that is also formed in the basic body. This cavity 404 serves to collect the quenching fluid before it is discharged to the spray holes 202. This is necessary to ensure that the quenching fluid is uniformly distributed to the spray hole pattern 204 so that the same quantity of quenching fluid and the same quenching fluid pressure are applied to all of the spray holes 202 at the same time.

In order to ensure that the quenching fluid is also distributed in the cavity 404 at high quenching fluid pressures, the intermediate element 300 is further designed as a baffle plate, which distributes the flow of the quenching fluid. For this purpose, elongated holes 302 are formed in the intermediate plate, which form a fluid passage in the direction of the spray hole pattern 204. The elongated holes 302 in turn are covered by baffle structures 320, sometimes referred to as "baffle bars", which deflect the quenching fluid entering the elongated holes 302 and distribute same in the fluid receiving compartment 203 of the cover element. The elongated holes 302 and the structures 320 ensure that the quenching fluid is not only transferred centrally into the spray hole pattern 204, but that the same pressure and the same quantity of quenching fluid are applied to all of the spray holes 202. It can thereby be ensured that quenching fluid is applied to the workpiece uniformly over the entire surface of the quenching spray.

Alternatively, of course, the intermediate element and/or the cover element can also be designed in such a way that a targeted, different, temporal and quantitative distribution of quenching fluid to the workpiece is possible. This can be used to control the stresses during the quenching and the resulting residual stresses in a targeted way, which can reduce the tendency to forming cracks.

Furthermore, the sectional view of FIG. 3 shows that the intermediate element also has a cavity 304, which is fluidically connected to the cavity 404, in which quenching fluid can be accumulated in a sufficient quantity to output it as far as possible at the same time uniformly in the direction of the spray hole pattern.

As mentioned above and can be gathered from the sectional view of FIG. 3, the intermediate member 300 has structures 320 which have the effect that the quenching fluid, which is introduced at high pressure through the quenching fluid inlet 502 into the cavity 404 and 304 and is guided via the elongated holes 302 in the direction of the spray hole pattern 204, on the one hand is accumulated in the cavity 304 and, after passage through the elongated holes 302, is deflected or distributed such that quenching fluid is applied to the entire fluid receiving compartment 203 before the quenching fluid enters the spray holes 202.

In the exemplary embodiment illustrated in FIG. 3, the spray holes are designed as rectilinear bores, but it may also be the case, as in particular FIG. 4 shows, that the spray holes are angled, in order, for example, to be able to output a quenching fluid jet in an angled direction. It is also possible that angled and rectilinear spray holes 202 are provided in the same cover element. It is likewise possible that the spray holes have different diameters or different geometries. For example, the spray holes or some of the spray holes 202 can also be formed conically, which creates a nozzle effect.

Furthermore, FIGS. 1 to 5 show that the housing 100 can also be actively cooled with a cooling fluid. This active cooling makes it possible even for materials to be used for the cover element 200 or the intermediate element 300, which normally cannot withstand, or withstand only insufficiently, the high temperatures and the high radiation and convection heat input of the inductively heated workpieces. Owing to the active cooling, aluminum or plastic can be used, for example, for the cover element 200.

To permit this active cooling of the housing 100, the housing 100, as mentioned above, has a coolant fluid inlet 506 and a coolant fluid outlet 508. In the housing 100 or in the individual parts 200, 300 and 400, corresponding coolant passages are formed, which connect the coolant inlet 506 to the coolant outlet 508 and guide the coolant through the housing and thus actively cool the latter.

The coolant passages, in particular those of the cover element, can additionally be equipped with a rough surface, as a result of which the surface which is cooled is increased as a whole (e.g., its surface area is increased), which in turn increases the cooling effect.

The coolant passage can be configured in different ways, wherein, in particular in the cover element 200, the side surfaces 210, 212, 214 and 216 are actively cooled to keep the cover element 200 at a temperature level at which no damage should be anticipated. In order to transfer the coolant from the coolant inlet 506 in the direction of the cover element 200, a passage opening 406 and 306 is respectively provided both in the basic element 400 and in the intermediate element 300, the passage openings being designed as slot-shaped passages and forming chamber-like sections in the illustrated exemplary embodiment.

Likewise, in order to transfer the coolant from the cover element 200 to the coolant outlet 508 again, a passage opening 408 and 308 is respectively provided both in the basic element 400 and in the intermediate element 300, the passage openings likewise being designed as slot-shaped passages and forming chamber-like sections in the illustrated exemplary embodiment.

The openings 406 and 306 serve as coolant supply openings and the openings 308 and 408 serve as coolant discharge openings.

The openings 406 and 306 are in turn fluidically connected to a chamber-shaped section 206, which is formed in the side wall 214 of the cover element 200, such that the coolant is transferred from the coolant fluid inlet 506 via the slot-shaped passage 406 of the basic body 400 into the slot-shaped passage 306 of the intermediate element 300 and from there into the chamber-shaped section 206, which thus serves as a coolant supply section of the cover element 200.

Similarly, in the opposite side wall 216 of the cover element, a chamber-like section 208 is also formed, which serves to guide coolant from the cover element 200 via the slot-shaped passage 308 of the intermediate element 300 and the slot-shaped passage 408 of the basic body back into the coolant outlet 508, such that the chamber-shaped section 208 serves as a coolant discharge section of the cover element 200.

In order to permit a fluidic connection between the coolant supply section 206 and the coolant discharge section 208, a coolant guiding section 220 and 222 is respectively formed in the side walls 210 and 212 of the cover element 200, which is shown in particular in FIGS. 4 and 5. As can furthermore be gathered from FIGS. 4 and 5, coolant guiding structures 224 are arranged in the coolant guiding sections 220 and 222, which lead to the formation of a plurality of coolant channels 226 in the side walls 210 and 222, through which coolant is uniformly guided and distributed over the entire side surface 210 or 212. The coolant guiding structures 224 ensure that coolant, which is received in the chamber-like coolant supply section 206, is uniformly distributed in the side walls 210 and 212 in the direction of the chamber-like coolant discharge section 208, such that both sides 210 and 212 of the cover element 200 are cooled.

As mentioned above and in particular can be gathered from the sectional view of FIG. 3, the individual elements 200, 300 and 400 are connected fluid-tightly to each other, wherein in particular sealing elements, such as O-ring seals, 610, 612, 614, and 616, are used. These sealing elements are arranged in such a way that the slot-shaped passages 306 and 308 are fluidically sealed both with respect to the quenching fluid receiving region 203, 304, 404 and to an external environment, such that the coolant can neither escape outwards into the outside space nor mix with the quenching fluid mix. This is especially important when the coolant and quenching fluid are in the form of different fluids.

Overall, the segmented structure formed from a plurality of partial elements makes it possible for the housing of the induction tool to be easily adapted to different applications. For example, the cover element 200 can be easily replaced in order, for example, to adapt different quenching sprays for different geometries with the workpieces to be quenched. It is also possible to use the same basic body 400 to represent a sensor housing instead of a quenching spray.

The active cooling of the housing also makes it possible for the housing to be made from other materials and easier-to-manufacture materials, thus enabling the use of materials that would not normally be able to withstand the high temperatures. Furthermore, the active cooling makes it possible for the tool to be able to be brought closer to the heated workpiece, which in turn is advantageous for the accuracy of measurements or the precision of the quenching.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved housings of induction hardening tools.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

LIST OF REFERENCE SIGNS

1 Quenching spray
100 Housing
200 Cover element
202 Spray holes
203 Fluid receiving compartment
204 Spray hole pattern
206 Chamber-like coolant supply section
208 Chamber-like coolant discharge section
210, 212, 214, 216 Side surfaces, side walls
220, 222 Coolant guiding sections
224 Coolant guiding structures
226 Coolant channels
300 Intermediate element
302 Elongated holes
304 Cavity
306 Slot-shaped passage for coolant supply
308 Slot-shaped passage for coolant discharge
310, 312, 314, 316 Grooves for sealing
320 Structures
400 Basic body
402 Side facing away from cover, recess
404 Cavity
406 Slot-shaped passage for coolant supply
408 Slot-shaped passage for coolant discharge
502 Quenching fluid inlet
506 Coolant inlet
508 Coolant outlet
610, 612, 614, 616 Sealing element

What is claimed is:

1. A spray head for a quenching device of an induction hardening system, comprising:

a basic body having a mounting surface, an intermediate member having a first surface and a second opposite surface, the first surface being mounted to the mounting surface of the basic body, and a cover element having a first surface and a second opposite surface, the first surface of the cover element being mounted to the second surface of the intermediate member such that the intermediate member is sandwiched between the basic body and the cover element, wherein the basic body includes a quenching fluid through-opening having an upstream end connectable to a source of quenching fluid and a downstream opening facing the intermediate member, a first coolant through-opening having a first end connectable to a coolant source and a second end facing the intermediate member and a second coolant through-opening having a first end for discharging the coolant after it has cooled the spray head and a second end facing the intermediate member, wherein the intermediate member includes a first coolant through-opening having a first end in the first surface of the intermediate member in fluid communication with the second end of the first coolant through-opening of the basic body and a second end in the second surface of the intermediate member facing the cover element and a second coolant through-opening having a first end in the first surface of the intermediate member in fluid communication with the second end of the second coolant through-opening of the basic body and a second end in the second surface of the intermediate member facing the cover element, wherein the intermediate member includes a quenching fluid chamber in fluid communication with the downstream opening of the quenching fluid through-opening of the basic body and a wall delimiting an end of the quenching fluid chamber, the wall having a plurality of through-openings configured to allow a quenching fluid in the quenching fluid chamber to exit the quenching fluid chamber in a direction toward the cover element, wherein the cover element includes an entrance coolant passage having a first end in the first surface of the cover element in fluid communication with the second end of the first coolant through-opening of the intermediate member and an exit coolant passage having a first end in the first surface of the cover element in fluid communication with the second end of the second coolant through-opening of the intermediate member and a plurality of cooling channels fluidically connecting the entrance coolant passage of the cover element to the exit coolant passage of the cover element, wherein the cover element includes a quenching fluid compartment in fluid communication with the quenching fluid chamber of the intermediate member and a plurality of through openings in the second surface of the cover element in fluid communication with the quenching fluid compartment, and wherein the cover element is configured to prevent the coolant in the entrance coolant passage of the cover element and the exit coolant passage of the cover element and the plurality of cooling channels from mixing with the quenching fluid in the quenching fluid compartment.

2. The spray head according to claim 1, wherein the cover element is releasably connected to the intermediate member and the intermediate member is releasably connected to the basic body.

3. The spray head according to claim 2, wherein the cover element includes a first side wall and a second side wall parallel to the first side wall and, wherein the plurality of cooling channels are located in the first side wall and/or in the second side wall.

4. The spray head according to claim 3, wherein each of the plurality of cooling channels has a first opening at the entrance cooling passage of the cover element and a second opening at the exit cooling passage of the cover element.

5. The spray head according to claim 4, wherein each of the plurality of cooling channels has a textured inner surface.

6. The spray head according to claim 4, wherein at least some of the plurality of cooling channels are parallel.

7. The spray head according to claim 4, wherein the through-openings in the second surface of the cover element are arranged in a pattern.

8. The spray head according to claim 1, wherein a downstream end of the quenching fluid through-opening is located at a bottom of a cavity in the mounting surface of the basic body.

9. The spray head according to claim 1, wherein the first coolant through-opening in the basic body is an elongated slot and the first coolant through-opening in the intermediate member is an elongated slot.

10. The spray head according to claim 1, including a baffle bar extending from a surface of the wall delimiting the end of the quenching fluid chamber and overlying at least two of the plurality of through-openings in the wall delimiting the end of the quenching fluid chamber.

11. The spray head according to claim 10, wherein the baffle bar projects into the quenching fluid compartment.

12. The spray head according to claim 11, wherein a downstream end of the quenching fluid through-opening is located at a bottom of a cavity in the mounting surface of the basic body.

13. The spray head according to claim 12, wherein the first coolant through-opening in the basic body is an elongated slot and the first coolant through-opening in the intermediate member is an elongated slot.

14. The spray head according to claim 13, wherein the basic body includes an end wall opposite the mounting surface of the basic body, and wherein the upstream end of the quenching fluid through-opening of the basic body and the first end of the first coolant through-opening of the basic body and the first end of the second coolant through-opening of the basic body are located in the end wall opposite the mounting surface of the basic body.

15. The spray head according to claim 14, wherein the first surface of the intermediate member is parallel to the mounting surface of the basic body, and wherein the first surface of the cover element is parallel to the mounting surface of the basic body.

16. The spray head according to claim 14, wherein the first surface of the intermediate member directly contacts the mounting surface of the basic body, and wherein the first surface of the cover element directly contacts the second surface of the basic body.

* * * * *